April 22, 1969  K. P. GOW  3,439,427
METHOD FOR NAVIGATING A SPACE VEHICLE
Filed March 17, 1965
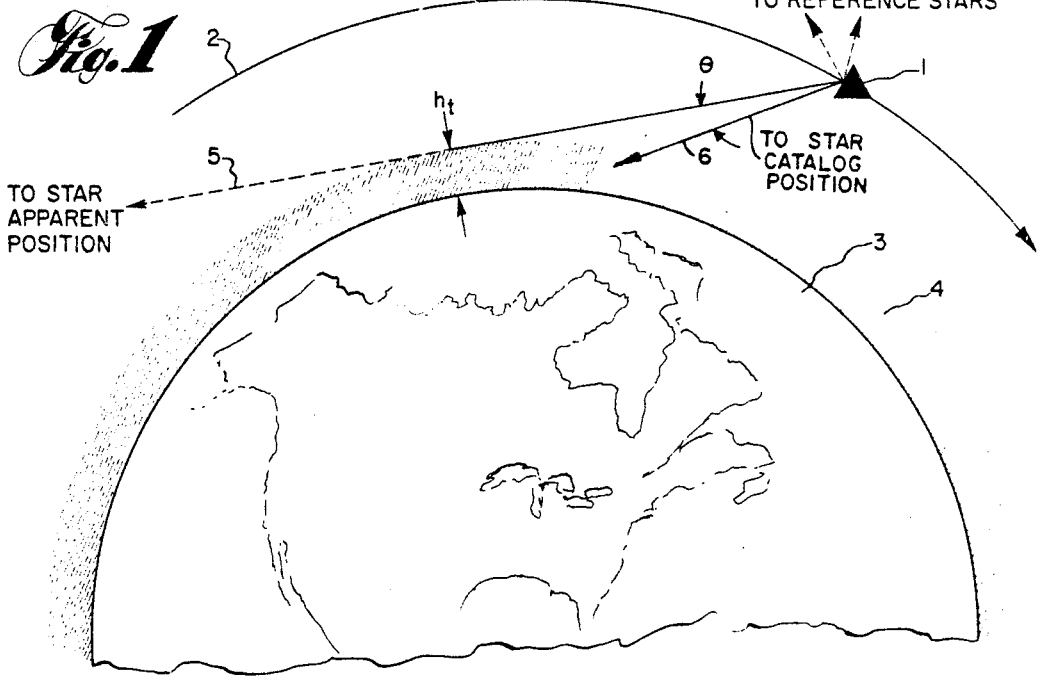
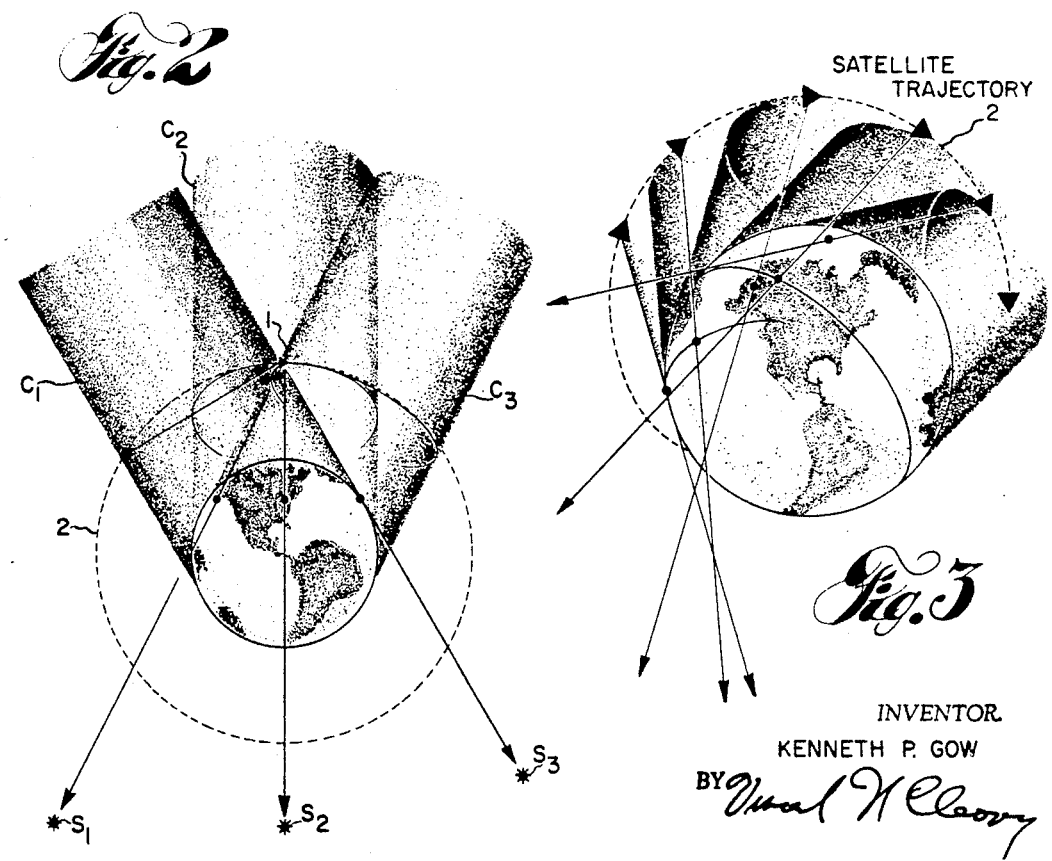
INVENTOR.
KENNETH P. GOW
BY *Vincent W. Cleary*
ATTORNEY

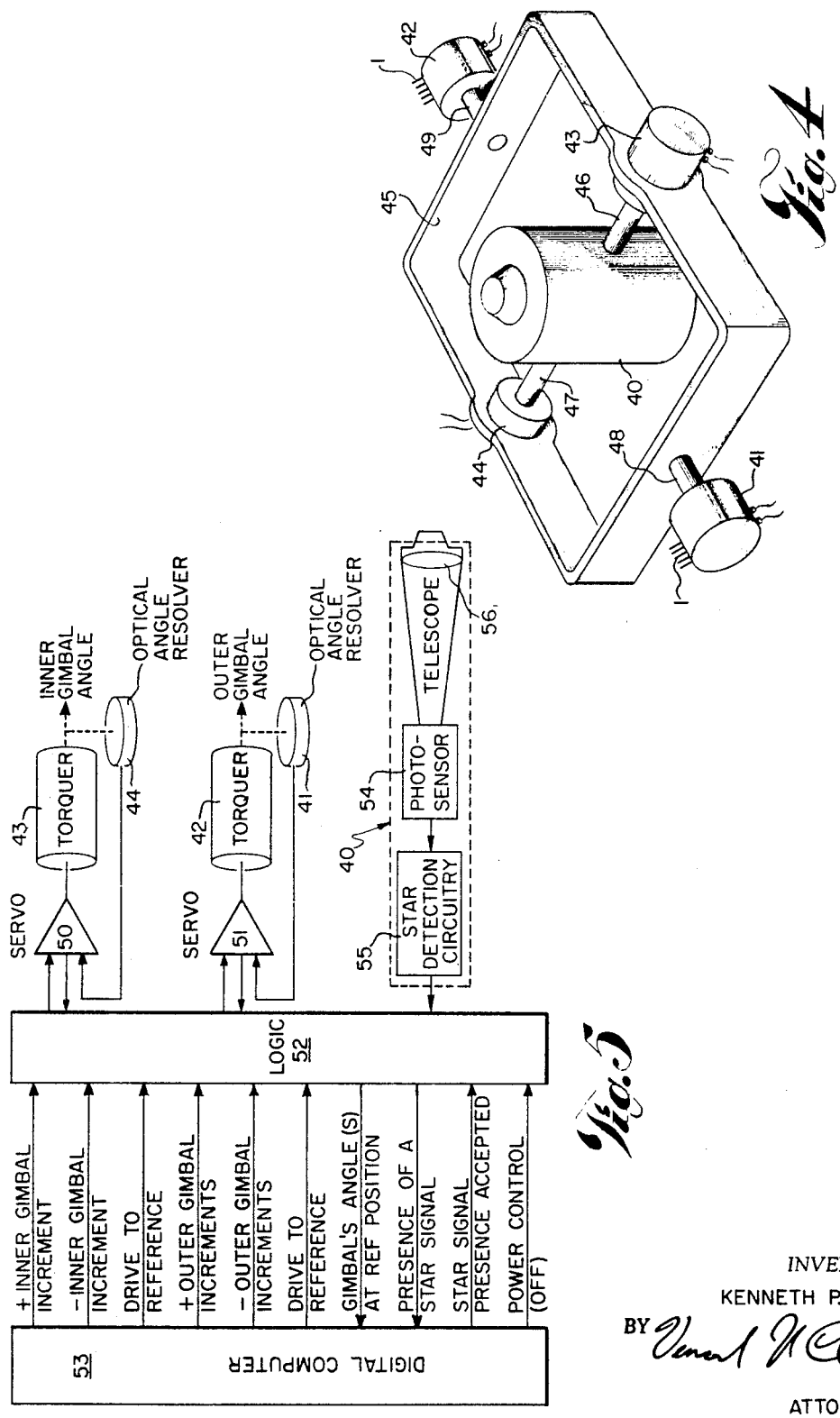

3,439,427
METHOD FOR NAVIGATING A SPACE VEHICLE
Kenneth P. Gow, Whittier, Calif., assignor to North
American Rockwell Corporation, a corporation of
Delaware
Filed Mar. 17, 1965, Ser. No. 441,000
Int. Cl. A41h 1/00; A42c 3/06; G01c 21/00
U.S. Cl. 33—61                    6 Claims

ABSTRACT OF THE DISCLOSURE

Sighting from a space vehicle, the difference between the apparent direction of a known star sighted through the atmosphere of a planet and its known direction in a stellar reference system established inertially or obtained by concurrent direct star sighting is measured. This value, taking the refractive index to be a regular and predictable function of height in the upper atmosphere, yields by computation the height at which the sighting direction at the vehicle cleared the planet's surface. A series of such operations provides sufficient data for computation of the orbital path or ballistic trajectory of the vehicle.

---

This invention pertains to a method for obtaining the information for navigating a space vehicle, and more particularly to a method of navigation based on systematic measurements of stellar ray refraction through the upper atmosphere, which takes advantage of the extremely constant and regular optical characteristics of that region.

The physical effect upon which the method is based is more specifically the variation of the atmospheric refractive index with density, and consequently with height. This physical effect appears to be a remarkably regular and predictable function in the upper atmosphere. In carrying out the method, the angle between a known star ray passing through the upper atmosphere of the earth (or other celestial body having an atmosphere of known refraction characteristics) and other known star rays not passing through the atmosphere is measured, and the difference from the value which would have been obtained in the absence of atmosphere is taken as a measure of the height at which the star ray cleared the earth's surface. From a series of such operations, data are obtained for processing which yields the orbital path or ballistic trajectory of the space vehicle.

Prior known methods, utilizing optical equipment, differ principally in the nature of the atmospheric layer tracked. One such method is disclosed in U.S. Patent No. 3,090,583, entitled "System and Method for Determining the Attitude of a Space Vehicle," issued May 21, 1963, to E. Behun et al. The method of that patent tracks the limb of the visible globe (planet) defined by seas, cloud and dust layers and continents and by averaging establishes a vertical. The accuracies obtainable by this method are estimated as being in the range of a few tenths of a degree. Another method that has been proposed is to track the globe in long-wavelength IR (4 microns and longer) on the theory that it would "appear geoidal" independent of the relative solar position. One disadvantage of this method is that radiation detectors in this range involve highly specialized optics and detectors, which ordinarily are not adaptable to star tracking.

A method of optical referencing based on refraction would be uncertain in the lower atmosphere because of obscuration and also because of long- and short-period variations in temperature, pressure, and humidity—all of which affect the refractive index. But the situation in a satellite vehicle is quite different and much more favorable. Most of the atmospheric variability takes place in the troposphere wherein most of the water vapor is trapped. Almost all the weather takes place therein and the boundary, called the tropopause, is abrupt. Furthermore, when the earth is viewed as a globe rather than as a landscape, it will have an extremely high degree of symmetry in the upper atmosphere. The upper layers constitute a regular gravity equipotential from analogous to the ocean. Gravity (mass-attraction plus centrifugal force) is the prime determinant of the mass distribution. Another consideration is that because of the earth's rapid rotation, nonisotropic conditions are apt to be of annular shape as is evident in other planets (Jupiter and Saturn) with relatively dense atmospheres and high rotation rates. Lastly, in the case of satellites, the orbiting vehicle will make multiple passes, each one over a different part of the globe. Opportunities for averaging or smoothing are ideal because of the regularity of orbital motion as compared with that of an aircraft or ship.

The basic method of this invention is to use the refraction of light by the earth's atmosphere (bending of the line-of-sight to a star) to obtain a self-contained measure of a satellite path or ballistic missile trajectory. The first step of the method being to determine the altitude at which the line-of-sight to a setting or rising star (as viewed from the satellite) passes through the atmosphere utilizing prior knowledge of atmospheric refraction properties. The second step is to use this information to obtain a partial position fix (knowledge that the satellite was on a given cylinder of slightly more than earth radius at a certain time). A sufficient number of these fixes suffices to determine the trajectory.

It is, therefore, an object of this invention to provide an improved method for navigating a space vehicle.

It is another object of this invention to provide a method for determining the path of a space vehicle utilizing star refraction.

It is a further object of this invention to provide a method of trajectory determination which can be carried out in midcourse flight.

It is still a further object of this invention to provide a method for determining the path of a space vehicle which utilizes nonradiating low power equipment contained within the space vehicle.

It is another object of this invention to provide a method for determining the path of a space vehicle which is not dependent upon weather, time or latitude.

The above mentioned and other features and objects of this invention will become more apparent by reference to the following description of the invention taken in conjunction with the accompanying drawings in which:

FIG. 1 is a diagram showing a satellite vehicle in orbit around the earth;

FIG. 2 is a diagram illustrating three cylinders of position intersecting at a fixed point hypothetically generated by three simultaneous sightings;

FIG. 3 is a diagram illustrating cylinders of position generated by a series of single sightings;

FIG. 4 illustrates a two-axis star tracker which may be employed in the method of this invention;

FIG. 5 illustrates, in block diagram form, the interrelations between the digital computer and the star tracker employed in the method of this invention.

Referring to FIG. 1, a space vehicle (satellite) 1 is schematically shown in an orbit 2 around the earth 3. A sighting is taken along line 5 to the apparent position of a known star. Line 5 is a straight direction line which is aligned at the space vehicle with the line of sight to the star. Where line 5 is most nearly tangent to the earth, it clears it at an altitude indicated by $h_t$; and this is referred to below as the point of tangency.

The star will appear at a higher elevation than computed catalog information, with respect to the reference stars, indicates it should be (along line 6 in this case). This difference in position, the amount of refraction shown as the angle $\theta$, is related to the atmosphereic density-altitude profile of the atmosphere 4. From a knowledge of this profile the altitude $h_t$ at the point of tangency may be accurately computed. This information gives one component of position of the vehicle with respect to the center of the earth. Six such measurements are sufficient to determine an orbital path or trajectory by classical methods.

Were it possible to take three such sightings simultaneously (with approximately 120 degrees of arc azimuth differences), a fix could be obtained in three dimensions, as expressed for example in terms of right ascension and declination and magnitude of the radius vector. Such a hypothetical fix is shown in FIG. 2 as the triple intersection point of three cylinders $C_1$, $C_2$ and $C_3$, the fixes being made on stars $S_1$, $S_2$ and $S_3$. For each observation, the cylinder is the locus of straight lines having the direction of line 5 and spaced at altitudes of $h_t$ from the surface of the earth.

In practice, a series of single sightings would be used, since the aspect of vehicle, earth, sun, and stars would rarely allow three simultaneous sightings. This approach also results in a more practical instrumentation when only one sighting is taken at a time. Each single observation establishes the vehicle on what might be called "a cylinder of position" of radius slightly greater than that of the earth. These observations yield three such cylinders. In theory two such three-dimensional fixes at known times would provide sufficient information for computation of the orbit trajectory.

A series of single sightings is illustrated in FIG. 3. In this illustration, portions of several "cylinders of position" are shown. Each sighting determines the orientation of the cylinder and the radius (earth's radius plus $h_t$ as shown in FIG. 1) of the cylinder. Obviously, altitude ($h_t$) plus the definition of the associated "cylinder of position" do not in themselves determine an orbit, or even a position on an orbit. Astronomers have long been accustomed to determining planetary and comet orbits by combining a number of time-separated observations (each observation defining a line—but not a position on the line) to yield an orbit. In so doing, the astronomers take advantage of the laws of motion which constrain the orbit so that only one orbit will fit a large number of prefect observations. At least six independent quantities must be measured, e.g., three declination angles and three right ascension angles at known times. Similarly, as shown in FIG. 3, only one trajectory will fit the laws of motion and intersect six or more cylinders at the required times. The actual trajectory or orbit determination from the measurements then becomes a computational process. Basic processes for such computation and the smoothing of data have long been straight-forward in principle but involved and laborious in practice. Recently, digital techniques have eased the task and the recently developed Kalman technique (Ref.: Gunckel, T. L., "Orbit Determination Using Kalman's Method," Navigation: Journal of the Institute of Navigation, vol, 10, No. 3, p. 273; autumn, 1963), which require about 2000 computer words makes the use of refraction sightings compatible with space vehicle digital computers.

A two-axis star tracker which may be employed to implement the method of this invention is illustrated in FIG. 4. The optical telescope 40 is supported about a first inner gimbal axis relative to gimbal 45 by shafts 46 and 47. An angular pick-off 44, which may be a resolver, is adapted to measure the inner gimbal angular position of telescope 40 relative to gimbal 45. A torquer motor 43 is adapted to position telescope 40 relative to gimbal 45. Gimbal 45 is mounted by shafts 48 and 49 for angular rotation relative to the space vehicle 1 about an outer gimbal axis which is perpendicular to the inner gimbal axis of the pickoff 44 and torquer motor 43. Torquer motor 42 is adapted to rotate gimbal 45 relative to the space vehicle 1.

An angular pickoff 41 is adapted to measure the outer gimbal angular position of gimbal 45 relative to the space vehicle 1. Instead of mounting the star tracker to the vehicle, it may be mounted to an inertial navigation platform which in turn would be mounted to the vehicle.

A more detailed discussion of the optical telescope 40 is contained in U.S. patent application Ser. No. 289,122, filed June 19, 1963, entitled "Star Tracker," by H. A. Beall, Jr., and assigned to North American Aviation, Inc., the assignee of this invention.

Referring to FIG. 5, contained within the telescope 40 is the lens 56 which focuses a star image that comes within its field of view onto the photosensor 54. The star detection circuitry 55 sends a pulse to the logic element 52 when the star image impinges on the photosensor 54. If the star within the field of view of the telescope is the correct star for viewing, the digital computer 53 (which is interconnected to the logic element 52) will inform the gimbal servo electronics to lock onto the star.

The electronics for positioning the telescope about the inner gimbal axis consists of servoamplifier 50 which supplies the position signal to torquer motor 43. The actual angular position of the telescope about the inner gimbal axis is picked off by resolver 44 and fed back as an input to the servoamplifier 50. The electronics for positioning the telescope about the outer gimbal axis consists of servoamplifier 51, torquer motor 42 and resolver 41. The operation of the outer gimbal servo is identical to the operation of the inner gimbal servo described previously.

The telescope 40 is time-shared between stars well away from the earth's horizon in order to establish the orientation of the star tracker base with respect to either the vehicle or a stabilized inertial platform mounted to the vehicle. It is important to note that the basic angular measurement is between background stars and a star seen through the edge of the atmosphere, thus precise gimbal pickoffs are required within the star tracker.

When a star, which is in view of the telescope and away from the sun by some 15 or 30 degrees, approaches rising or setting, the telescope is pointed and slaved to move up and down along the star's apparent path. Signals are obtained by the star image crossing the photosensor 54. This process might be repeated several times during the few seconds the star crosses the useful apparent tangent altitude.

The digital computer 53 associated with the star tracker controls the operation of positioning the telescope 40 and also carries out the additional functions of tangent altitude $h_t$ determination from refraction measurements and processes the data for orbit determination.

The interface signals connecting the computer 53 to the logic element 52 are comprised of:

Plus-inner gimbal and outer gimbal increment—signals for imparting increments of motion to the telescope 40 about the inner and outer gimbal axis in a plus direction;

Minus-inner and outer gimbal increment—signals for imparting increments of motion to the telescope 40 about the inner and outer gimbal axis in a minus direction;

Drive to reference—a signal for driving the telescope 40 to a reference angle about the inner and outer gimbal axis;

Gimbal's angles at reference position—this is a signal sent from the telescope positioning servos through the logic element 52 to the computer telling the computer that the telescope gimbals are at zero or other reference position;

Presence of a star signal—tells the computer that a star signal is being received by the telescope;

Star signal presence accepted—the computer analyzes the position of the star signal and determines if it is the correct star, in which case the star signal is accepted and position information processed by the computer;

Power control (off)—turns off power to selected portions of the system when not in actual use to conserve power.

ATMOSPHERIC REFRACTION AND DENSITY UNCERTAINTIES

It is assumed that predticable large scale seasonal and latitude variations will be mechanized out and need not be treated further in this discussion. Therefore, interest will be directed to the 50,000- to 75,000-foot bracket for the altitude of tangency for the following reasons:

(1) It is above most of the local weather disturbances.

(2) Operational interference by clouds is negligible or nonexistent.

(3) The available density information indicates this is the altitude region of least uncertainty.

(4) This altitude region seems to represent a best technical compromise between difficulty in daylight star tracking at the lower altitudes and difficulty in measuring the refraction angle with sufficient precision at much greater altitudes together with density and density gradient uncertainties.

A rough check on air density variations can be obtained by first recalling that the normal barometric variations are roughly one inch of mercury or 3 percent and that this is nearly a measure of the variations in the total weight of the atmosphere per unit area above the measuring station. It is then pertinent to recall that most of the atmosphere is below 20,000 feet, hence, the 3 percent cannot be applied in entirety to say 80,000 feet where the total barometric pressure is only one inch of mercury.

The density, $\rho$, altitude, $h$, relationship of an idealized, uniform temperature atmosphere in a uniform gravity field is of the following exponential form:

$$\rho = \rho_0 e^{-\frac{h}{h_s}}$$

with $$\frac{\partial \rho}{\partial h} = -\frac{\rho_0}{h_s} e^{-\frac{h}{h_s}}$$

where $h_s$ is the scale height of the atmosphere, roughly 22,000 feet at altitudes of interest for the real atmosphere, to which the 3 percent should be applied.

According to reference information, the index of refraction, $\eta$, of air is essentially dependent upon density (and temperature and pressure only as these affect density).

Water vapor corrections (less than 0.1 mm. of water vapor possible at −40 F.) approximate a maximum of $1 \times 10^{-8}$ in. ($\eta$−1) for the conditions of interest and hence can be ignored. The index of refraction is a function of wavelength and the star image will have a slight color dispersion (elevation angle only) depending upon the type of photodetector material used for photosensor 54. The following table gives the approximate color dispersions for spectral ranges of some photodetector materials that might be used.

| Photo surface | Approximate effective wavelength (microns) | | Star image color dispersions in percent of total refraction angle |
|---|---|---|---|
| S4 | 0.45 | 0.55 | 0.6 |
| S20 (multialkali) | 0.45 | 0.7 | 1.5 |
| S17 | 0.45 | 0.6 | 1.2 |
| CdSe | 0.5 | 0.65 | 1.0 |
| CdS | 0.45 | 0.6 | 1.2 |

This may be one limitation on the optical resolution of the system—otherwise the index of refraction will be treated as invariant with wavelength and only dependent upon density.

Polarization, a function of scattering angle, will be ignored because it is only important from a standpoint of gradient response if there are elements within the optical system which are selective to the plane of polarization.

Refraction physics

When a ray of light enters a medium of varying refraction index, $\eta$, its curvature, $C$, is given by (Ref.: Born, Max, and Wolf, Emil, Principles of Optics, Pergamon Press, New York, 1959)

$$C = \frac{\text{grad } \eta}{\eta} \sin \beta \quad (1)$$

where $\beta$ is the angle between the ray and the gradient. The total refraction, $R$, over a ray path, $S$, is $$R = \int_S C \, ds \quad (2)$$

For an observer on the surface of the earth, the total refraction (Ref.: Smart, W. M., "Spherical Astronomy," Cambridge University Press, Cambridge, 1960)

$$R = a_0 \eta_0 \sin \delta \int_1^{\eta_0} \frac{d\eta}{\eta (r^2 \eta^2 - a_0^2 \eta_0^2 \sin \delta)^{1/2}} \quad (3)$$

where $a_0$ is the radius of the earth and $\delta$ is the zenith angle. $r$ is the radius from the earth's center of a point on the ray path passing through the atmosphere with index of refraction $\eta$. For a ray which is horizontal when it reaches such an observer, $\delta$ is 90 deg. and $\sin \delta$ is unity. Equation 3 becomes $$R_0 = a_0 \eta_0 \int_1^{\eta_0} \frac{d\eta}{\eta (r^2 \eta^2 - a_0^2 \eta_0^2)^{1/2}} \quad (4)$$

If, instead of striking an observer stationed on the earth's surface, the ray passes tangent to the earth and continues through the atmosphere to an observer stationed on a satellite, the total refraction is twice that given by Equation 4. Further, if the ray path is assumed to be tangent at some altitude $h_t$ rather than at the earth's surface ($h_t = 0$), Equation 4 becomes $$R_{h_t} = 2 \int_1^{\eta_{h_t}} \frac{d\eta}{\eta \left[ \left(1 + \frac{Z - h_t}{a_0 + h_t}\right)^2 \left(\frac{\eta}{\eta_{h_t}}\right)^2 - 1 \right]^{1/2}} \quad (5)$$

where $Z$ is the geometric altitude. The integration may be completed if the relation between $Z$ and $\eta$ is known.

The index of refraction $\eta$ is related to atmospheric density by Dale and Gladstone's Law (Ref.: Born, Max, and Wolf, Emil, Principles of Optics, Pergamon Press, New York, 1959)

$$K\rho = \eta - 1 \quad (6)$$

where $K$ is the density coefficient of refraction modulus.

If the index of refraction and density of the atmosphere at the earth's surface are known, the constant $K$ is determined. The relationship of atmospheric density and altitude determines the total refraction given by Equation 5.

The accuracy of the development was checked by using Table IV from the 1962 ARDC Standard Atmosphere (Ref.: Atmospheric Sounding by Satellite Measurements of Stellar Refraction, University of Michigan, Report No. 04963-2-T, dated December 1962) for the altitude-density relation and numerically integrating Equation 5. The results check with twice the values given in the Air Almanac for observed atmospheric refraction at flight altitudes to 55,000 feet.

Density variations

The total refraction angle is determined by the integrated effects of density gradient along the path of the ray. Ray curvature is a function of the atmospheric density gradient: therefore, the total refraction angle is determined by the atmospheric density-altitude profile. Two basic facts about the refraction phenomenon make examination of the entire profile unnecessary: (1) 70 percent of the refraction occurs in an altitude range of 13,000 feet (Ref.: Atmospheric Measurements from Satellite Observations of Stellar Refraction, University of Michigan, Report No. 04963–1–T, dated January 1962); and (2) interlevel density variations are highly correlated (Ref.: Cole, A. E., et al, "Density Distribution, Interlevel Correlations and Variation With Wind," Air Force Surveys in Geophysics No. 151, July 1962, NASA No. N63–14004). Therefore, tangent altitude errors may be computed directly from density profile variations over a narrow range of altitudes.

SEARCH RATE REQUIREMENT

The star tracker search rate requirement is fundamentally established by the uncertainty in apparent star position (in terms of telescope gimbal pointing angles) and the time allowed for searching. The uncertainty in apparent star position (star tracker alined to the background stars) can only arise from uncertainties in refraction angle (because of vehicle position uncertainty and atmospheric anomalies) and from gimbal pointing inaccuracies. The uncertainty in star apparent position as viewed through the atmosphere is essentially along an apparently vertical line (at the horizon). In a practical sense the width of the search area is determined by telescope resolution and gimbal pointing inaccuracies.

One approach is to point the telescope at a given fixed tangent altitude and wait for the star to rise or set through this tangent altitude. The rate of change of the refraction angle is ignored in this case because this is small compared to the total motion.

With the telescope base, either the vehicle or the stabilized platform, aligned to the background stars, the angular uncertainty in position of the path of the setting or rising star is substantially related to gimbal pointing accuracy and stability. It now becomes obvious that an accurate telescope pointing system reduces the area of search for the star to essentially a line search and thus increases the capability to track stars through the edge of the earth's atmosphere.

*In summary*

The star tracker telescope is used on a time shared basis. Part of the time is spent tracking stars whose line-of-sight is well away from the earth, sun, or moon. The tracking of these stars serves to establish a known orientation of the star tracker. The remainder of the time, the star tracker is used to track stars as they rise or set through the apparent edge of the earth's atmosphere. Because of the severe background illumination gradient occurring during daytime operation, it is contemplated that the star tracker will be pointed at a given altitude of tangency to the earth and a signal detected when the star appears to be coincidental with this line of tangency. Because of refraction the star will appear at a higher elevation, with respect to other stars, than star catalog information would indicate. The amount of refraction is then related to the atmospheric density—altitude profile, and from a knowledge of this altitude—density profile, a calculation can be made predicting the amount of refraction when looking at a given star through the edge of the earth's atmosphere, or conversely, measuring the amount of refraction yields the altitude of the point of tangency. This information gives one component of position of the star tracker and thereby the vehicle which contains it with respect to the center of the earth. Six such measurements are sufficient to determine an orbit or trajectory by classical methods.

As used in this application, the computer would direct the star tracker to track stars apparently remote from the earth's atmosphere in order to establish a coordinate reference with respect to inertial space; find a star from its catalog information, from its rough knowledge of missile or satellite trajectory, which will shortly be rising or setting through the earth's atmosphere; select an apparent altitude of tangency at which to make an observation; point the star tracker at the altitude of tangency; keeping it rotating at the apparent rate of horizon rotation; receiving an electrical signal when the star crosses the very limited field of view of the tracker; interpreting this signal in terms of an error in one component of satellite or missile position; repeating the entire process a number of times; applying Newton's laws of motion together with various computer processes to determine a corrected orbit or trajectory; and, finally, instigating appropriate control section, whether this be in the form of a radio singal to a ground operator, or a rocket control to alter the orbit or trajectory or the control and operation of reentry steering mechanisms.

While the method of this invention has been described in connection with specific apparatus, it is to be clearly understood that this description is made only by way of example and not as a limitation to the scope of the invention.

What is claimed is:

1. A method for navigating a space vehicle compising the steps of:
    (a) sighting on a known first star the sight line to which does not pass through the atmosphere of a planet to determine a reference line;
    (b) sighting on a second star the sight line to which passes through the atmosphere and measuring the angle between the second named sight line and said reference line;
    (c) determining the angular difference between the direction of a straight line aligned at the space vehicle with said second named sight line and the known physical direction of said second star with respect to said reference line; and
    (d) determining the height at which said second named sight line cleared the planet's surface from said angular difference between the sighted position and the known physical position of said second star with respect to said reference line and the predictable index of refraction of the atmosphere.

2. A method for navigating a space vehicle comprising the steps of:
    (a) measuring the angle between a straight direction line aligned at the space vehicle with a sight line to a first star the sight line to which passes through the atmosphere and the direction of a known second star the sight line to which does not pass through the atmosphere;
    (b) determining the angular difference between said straight direction line and the known physical position of said first star with respect to said second star; and
    (c) determining the height at which said straight direction line cleared the planet's surface from the angular difference between the sighted apparent position and the known physical position of the star, and from the predictable index of refraction of the atmosphere.

3. A method for navigating a space vehicle having a star tracker and computer mounted thereto comprising the steps of:
    (a) directing the star tracker to track known stars remote from the atmosphere thus establishing a coordinate reference system with respect to inertial space;
    (b) determining the star tracker's telescope pivoting direction relative to said system required to observe a known star the sight line to which passes through the atmosphere;
    (c) determining the difference between the apparent and the known angular position of said last named star with respect to the coordinate reference system;
    (d) computing therefrom by the use of the predictable index of refraction of the atmosphere the cylindrical locus of said vehicle with respect to the earth; and
    (e) repeating steps (a) through (d) and applying the laws of motion to determine the path of the vehicle.

4. A method for navigating a space vehicle comprising the steps of:
   (a) establishing a reference system in inertial space;
   (b) measuring the apparent position with respect to said reference system of a star of the sight line to which passes through the atmosphere and said reference line;
   (c) determining the angular difference between the apparent and the known position of said star with respect to said reference system;
   (d) determining the height at which a straight direction line aligned with said sight line at the vehicle cleared the planet's surface using said determined angular difference and the predictable index of refraction of the atmosphere;
   (e) computing a cylinder of vehicle position having a radius equal to the planet's radius plus said determined height;
   (f) repeating steps (a) through (e) to determine the path of the space vehicle.

5. A method for navigating a space vehicle comprising the steps of:
   (a) measuring the refraction of a line of sight from the vehicle to a known star sighted through the atmosphere of a celestial body;
   (b) determining, from prior knowledge of the refraction properties of the atmosphere of the celestial body, the altitude with respect to the celestial body of a straight direction line aligned at the space vehicle with the line of sight to said known star;
   (c) determining a partial position fix from knowledge that said vehicle is on a given cylinder of position having a radius equal to the radius of the planet plus said determined altitude at a certain time;
   (d) repeating steps (a) and (c) to determine the path of said vehicle.

6. A method for navigating a space vehicle comprising the steps of:
   (a) establishing a reference system utilizing stars that are remote from atmospheric effects;
   (b) sighting on another star the sight line to which passes through the atmosphere;
   (c) determining the angular difference between the sighted position of said other star and the known physical position of said other star with respect to said reference system;
   (d) determining the height at which a straight direction line aligned at the space vehicle with said sight line cleared the atmosphere from prior knowledge of atmospheric properties;
   (e) determining a partial position fix utilizing said determined height;
   (f) repeating steps (a) through (e) at least six times to determine the path of the vehicle.

References Cited

UNITED STATES PATENTS

| | | |
|---|---|---|
| 3,194,949 | 7/1965 | Jasperson. |
| 3,229,521 | 1/1966 | Freeman. |
| 3,263,088 | 7/1966 | Goldfischer. |
| 3,290,933 | 12/1966 | Lillestrand et al. |
| 3,360,638 | 12/1967 | Lillestrand et al. |

ROBERT B. HULL, Primary Examiner.

U.S. Cl. X.R.

235—150.26; 73—178; 250—203

PO-1050
(5/69)

UNITED STATES PATENT OFFICE
CERTIFICATE OF CORRECTION

Patent No. 3,439,427　　　　　　　　　　Dated April 22, 1969

Inventor(s) K. P. Gow

It is certified that error appears in the above-identified patent and that said Letters Patent are hereby corrected as shown below:

In column 10, claim 6 (d), line 16, "atmospheric properties" should read --- atmospheric refraction properties ---.

SIGNED AND
SEALED
JUN 16 1970

(SEAL)
Attest:

Edward M. Fletcher, Jr.
Attesting Officer

WILLIAM E. SCHUYLER, JR.
Commissioner of Patents